(12) United States Patent
Rutenberg et al.

(10) Patent No.: US 8,199,997 B2
(45) Date of Patent: Jun. 12, 2012

(54) FEATURE DEPENDENT EXTENDED DEPTH OF FOCUSING ON SEMI-TRANSPARENT BIOLOGICAL SPECIMENS

(75) Inventors: Mark Rutenberg, Monsey, NY (US); Richard Scott, Monsey, NY (US); Robert Tjon, Nyack, NY (US); Stephen Frist, Maleh Adumim (IL)

(73) Assignee: CDX Laboratories, Inc., Suffern, NY (US)

(*) Notice: Subject to any disclaimer, the term of this patent is extended or adjusted under 35 U.S.C. 154(b) by 902 days.

(21) Appl. No.: 12/193,666

(22) Filed: Aug. 18, 2008

(65) Prior Publication Data
US 2009/0046909 A1 Feb. 19, 2009

Related U.S. Application Data

(60) Provisional application No. 60/956,504, filed on Aug. 17, 2007.

(51) Int. Cl.
*G02B 21/00* (2006.01)
*G06K 9/00* (2006.01)

(52) U.S. Cl. .................................................. 382/133
(58) Field of Classification Search ............... 382/128, 382/133
See application file for complete search history.

(56) References Cited

U.S. PATENT DOCUMENTS

| | | | | |
|---|---|---|---|---|
| 5,647,025 A | * | 7/1997 | Frost et al. | 382/255 |
| 6,201,899 B1 | * | 3/2001 | Bergen | 382/284 |
| 6,297,044 B1 | * | 10/2001 | Eisen et al. | 435/287.1 |
| 7,417,213 B2 | * | 8/2008 | Krief et al. | 250/208.1 |
| 2005/0286800 A1 | * | 12/2005 | Gouch | 382/284 |

* cited by examiner

*Primary Examiner* — Clayton E LaBalle
*Assistant Examiner* — Leon W. Rhodes, Jr.
(74) *Attorney, Agent, or Firm* — Levisohn Berger, LLP

(57) ABSTRACT

A method and system for constructing a digital image of a three-dimensional biological specimen that displays diagnostically important information—substantially to the exclusion of unimportant information. The system de-enhances features in a cellular specimen which are not diagnostically important and enhances those which are. The system selects the sharpest pixel for each pixel location from among a stack of image slices and copies them into a composite image.

15 Claims, 4 Drawing Sheets

FEATURE DEPENDENT EXTENDED DEPTH OF FOCUSING ON SEMI-TRANSPARENT BIOLOGICAL SPECIMENS

RELATED APPLICATIONS

This application claims the benefit of provisional application 60/956,504 filed on Aug. 17, 2007.

FIELD OF THE INVENTION

The present invention relates to the field of digital processing of microscope images, specifically to an extended depth-of-focus (EDF) of thick or three-dimensional semi-transparent biological specimens.

BACKGROUND OF THE INVENTION

High-resolution microscopy suffers from limited depth of field, which prevents thick or uneven specimen preparations from being imaged entirely in focus. Objects that appear outside the narrow depth of field or focal plane become quickly blurred and out of focus, forcing the microscopist to constantly manually focus back and forth. This not only limits the productivity of the microscopist but also increases the likelihood he or she will miss a subtle feature that may appear only in a narrow focal plane.

Moreover, this limited depth of field becomes worse as the magnification increases because it is directly dependent on the numerical aperture of the microscope objective, which increases with the magnification. This prevents a microscopist from using the highest magnification objective on a consistent basis, and forces him/her to strike a balance between magnification and the labor-intensive task of constant up and down focusing.

Thick tissues, that are thicker than the depth of field of a microscope objective, introduces a third dimension to a biopsy sample, in effect making the specimen, or portions thereof, three-dimensional in space. A consequence of the three-dimensional character of a specimen is that the cellular material is located at various focal planes, which thereby requires constant focusing and refocusing to observe cells at various contours of the sample.

Specifically, when obtaining a non-lacerational brush biopsy of a tissue, a brush is used which is sufficiently stiff so as to penetrate the various layers of epithelium In the process of obtaining a full thickness tissue specimen, tissue fragments in addition to single cells and cell clusters ate obtained and transferred onto a microscope slide. This occurs, when the brush biopsy instrument disclosed in U.S. Pat. No. 6,258,044, incorporated herein by reference is used to sample oral epithelial tissue. Similarly, when using the brush biopsy instruments for sampling tissue of the gastrointestinal tract disclosed in U.S. Pat. Nos. 6,494,845; 6,676,609 and 7,004,913, all of which are incorporated herein by reference, the resultant specimen contains single cells, cell clusters and thick tissue fragments. These specimens are markedly different from the cell monolayers prepared for the analysis of exfoliative cytological specimens, whereby only a superficial sweep of a tissue is conducted, and no tissue fragments are obtained.

This novel specimen, containing single cells, cell clusters and tissue fragments, is essentially a hybrid between a cytological smear, and histological sections. The ability to view tissue fragments, in addition to single cells, confers an enormous informational advantage to a pathologist in making a diagnosis. Intact tissue provides the pathologist with important information about a tissue's architecture, which is not available in cytological smears. This benefit is especially critical in the evaluation of gastrointestinal tissue, which is a complex tissue containing various cell types including glandular and columnar epithelium.

Furthermore, U.S. Pat. Nos. 6,297,044 and 6,284,482—both of which are incorporated herein by reference—disclose a computerized system for analyzing and classifying these novel specimens consisting of disaggregated cells and tissue fragments. In conducting its analysis of a slide, the computer scores and classifies cells that are most abnormal within a population of cells based on morphological criteria. As such, when analyzing a specimen that has dimensionality, often there will be areas of the specimen that are out of focus. As a result, the computer may classify cells found in these out of focus areas as abnormal because they may appear to the computer as exhibiting features that it is trained to classify as abnormal.

Composing a two-dimensional image out of the three-dimensional specimen would combine the respective advantages of each. A pathologist would be able to capture the information available from a three-dimensional sample without the drawbacks associated with the constant need to focus and refocus the microscope. This would additionally, make the computer analysis of such samples more sensitive, as normal cells that are out of focus and thusly appear to the computer as abnormal, would be eliminated or significantly reduced.

This can be achieved through extended depth of focus (EDF) processing techniques, which are well known in the prior art See, for example, U.S. Pat. No. 4,584,704. With EDF processing an automated microscope captures a set of images taken at different focal planes at the same location on a slide and then combines these images into a composite image. A single image appears sharp and well-focused only in those areas where the focal plane intersects the three-dimensional contours of the sample. A single high-resolution image cannot be in-focus everywhere. With EDF processing an automated microscope captures a set of images taken at regular z-intervals at the same location and then recovers from each slice those pixels that are in focus to build a single composite images from the in focus pixels. Once the in-focus pixels of each image are fused into one image, the resultant image is essentially in-focus everywhere.

However, the EDF algorithms of the prior art—which are ideal for creating a composite image of the top surface of a three-dimensional object—do not work well for biological specimens, which present an additional complexity of having multiple semi-transparent objects or cells stacked on each other. This is because in composing a composite image, standard EDF algorithms blindly extract the sharpest pixels from each focal plane, raising the possibility that a composite cell image contains pixels coming from multiple cells that happened to be situated on top of each other. In that instance a composite image may appear to represent a single cell, when in fact there were several cells stacked on top of each other, each of which could be observed by a microscope due to their semi-transparent character. For example, in U.S. Pat. No. 4,661,986 the best-focused pixels are selected to be incorporated into the composite image. In U.S. Pat. No. 7,058,233 a composite image is constructed by selecting well-focused edges or boundaries. These methods are of no utility when attempting to construct a composite image of a semi-transparent biological sample for diagnostic purposes, whereby it is critical to have all the pixels come from a single object or cell and to avoid pixel contamination. In order for an EDF algorithm to be properly applied to thick, semi-transparent biological specimens it must take into account which pixels belong to which object, and preserve most of the pixels of that cell or object even though they may not necessarily be sharp.

Additionally, for diagnostic purposes, a pathologist prefers to see a composite image that only includes cell nuclei This presents a further limitation of standard EDF algorithms; the nucleus' sharpness might be less than the cell boundary's sharpness, causing the composite image to only display the cell boundary and not the diagnostic important cell nucleus.

This problem is particularly pronounced in the case of columnar epithelial cells. Columnar cells, which are found in the lining of the gastro-intestinal tract, are characteristically tall or oblong with its nucleus usually situated in its middle to lower region. When viewing a sample of columnar cells that are vertically oriented on a slide, such that the microscope is looking down the axis of a cylindrical cell, the cell boundaries may be in best focus at the top of the sample while the nucleus is in-focus at the bottom. A pathologist needs to see the nucleus, but prior art EDF algorithms, which select in-focus images based solely on the sharpness of the image, cannot distinguish between different objects, both of which appear sharp and in-focus. As a result, both the cell boundary and the cell nucleus will be selected, or in some instances only the cell boundary will be selected. In the latter situation, the resultant composite image will feature an array of abutting cell boundaries, and will take on the appearance of fish scales. This image will be sharp and in-focus everywhere, but will not convey any diagnostically important information to an examining pathologist or to a specialized computer system that may be analyzing the slide.

In summary, the semi-transparent quality of biological specimens presents a problem with applying prior art EDF algorithms to thick cellular specimens. The prior algorithms were designed to create a composite image of the outside surface of a three dimensional object. With biological specimens, on the other hand, the area of interest is not limited to the outside surface, but rather there are areas of interest below the outside surface of a specimen. Due to light absorption within a tissue, structures on the surface have a tendency to have a higher contrast or sharpness than structures inside a transparent tissue. Because tissue is comprised of a mass of cells, a pathologist needs to see the cells and nuclei that are situated below the outside surface, which comprise the thickness of the tissue. Additionally due to the disaggregated nature of the cellular samples obtained by a brush biopsy, a slide prepared in connection with a brush biopsy will inevitably contain cells that overlap and overlay each other. Consequently, an examining pathologist or specialized computer would want to build a constraint into the EDF algorithm such that pixels of objects can only come from one object or cell only and not from neighboring objects that are situated either on top or beneath the cell being imaged. For the purpose of this document this requirement is referred to as "PCO" or Pixel Constrained to an Object". Furthermore, there are objects of no diagnostic significance, such as cell walls or artifacts that should be deemphasized or eliminated from a composite image.

SUMMARY OF THE INVENTION

An EDF system is contemplated which includes the ability of an EDF algorithm to (a) favor objects of interest and deemphasize objects of non-interest (b) wherein pixels are constrained to come from that single object of interest only. Instead of blindly capturing images that appear sharp, the EDF algorithm, which is the subject of the current invention, is adapted to select in-focus images or objects that are of diagnostic importance to a pathologist.

Objects of no diagnostic importance are removed by performing a morphological erosion on all sharp appearing objects. In a preferred embodiment, an erosion algorithm is implemented which erodes pixels from each side of an image. Consequently, thin cell walls that appear sharp and in focus, but confer no diagnostically important information, will be eliminated or significantly diminished The larger image of the cell's nucleus on the other hand, will survive the erosion process, thereby preserving the diagnostic objects.

When analyzing cellular specimens of the gastrointestinal tract, it is critical for an examining pathologist to observe the presence or absence of goblet cells. Goblet cells function as secretory cells and contain a sac of mucus in their interior One of the key morphological characteristics of goblet cells is a large central blob—that is light in contrast to the cell walls and the cell nucleus. Diagnostically important goblet cells will as such be preserved in the erosion step.

To meet the PCO requirement, a morphological closing is applied. A closing is a dilation followed by erosion, to close any small holes in the nuclei and goblet cells, in effect assuring that pixels come from the same object.

In an embodiment of the current invention, a computer is used to analyze columnar epithelial cells taken from the gastrointestinal tract. An examining pathologist prefers seeing diagnostic information over non-diagnostic ones. The diagnostic ones include the goblet cells and nuclei of the columnar cells that are usually located within the tissue. The non diagnostic structures are the cell boundaries that appear readily on the tissue surface which look like fish scales and often confuse the prior art EDF algorithms due to its greater sharpness value over columnar nuclei and goblet cells.

DETAILED DESCRIPTION OF THE INVENTION

Embodiments of the present invention will now be described with reference to the above-identified figures of the Drawings. However, the Drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein, all without departing from the spirit of the invention.

Limited depth-of-focus is a deficiency in microscope imaging of thick, semi-transparent biological samples that is effectively be rectified using EDF processing techniques that is the subject of the current invention.

Typically, in the preparation of a cellular specimen for pathology, a clinician will transfer and affix cells and/or tissue to a glass microscope slide. The slide is then sent to a laboratory for further processing and medical diagnosis. Such further processing commonly includes staining the slide, for example with Feulgen or Papanicolaou stains, and applying a cover slip. The slide is then analyzed by either a pathologist or by a computer—or by some combination thereof. In the current invention, however, a slide that comprises three-dimensionality undergoes still additional processing prior to being examined by either a pathologist and/or computer. Specifically, a captured digital image of the cellular specimen is further processed by the EDF system that is the subject of this invention which produces a novel enhanced image that presents diagnostically important cellular features that are in-focus everywhere.

The software for performing the steps of the inventive system described herein are executed by a computer—as is well know in the art. The software may be implemented on programmed general purpose computer, a special purpose computer and/or a microprocessor or the like.

Figure 1:
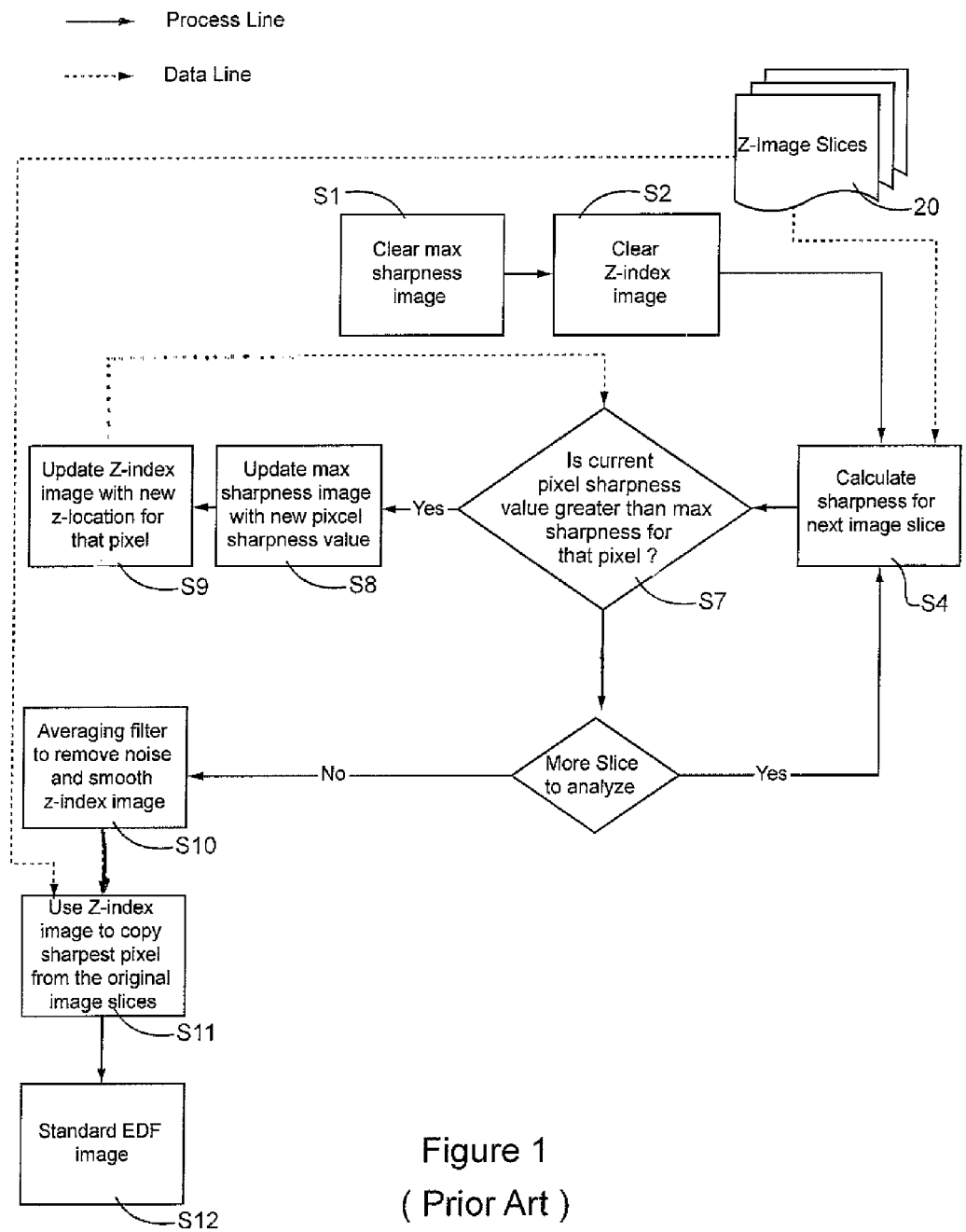
FIG. 1 is a block diagram showing the steps of prior art EDF algorithms.

FIG. 1 shows various steps involved with prior art EDF algorithm At initialization, two temporary image buffers awe cleared, the Z-index image buffer (step S1) and the max-sharpness image buffer (step S2). The max-sharpness image buffer represents the max-sharpness value for each of the pixel locations and the z-index buffer stores the image slice id number from where the max-sharpness pixel is located. In an initial step S4, a sobel or laplacian or any kind of sharpness operator is applied to calculate the sharpness value for each of the pixels in a z-image slice 20. The max-sharpness values and slice id number are respectively stored in the max-sharpness and z-index buffers. In step S7, for each z-index slice that is processed, the computer compares pixel values at each location of the slice with the stored max-sharpness for that pixel location Note that for the first slice that is processed, the pixels are not compared to those of another slice as there is no preceding slice. If a pixel's sharpness value is greater than the stored max-sharpness value in the corresponding pixel location of the max-sharpness buffer, the software is directed to perform several actions, (1) replace the stored max-sharpness value in the max sharpness buffer with the new sharpness value at the corresponding pixel location S8, (2) replace the z-index value of the z-index buffer with the image slice id number at the corresponding image location S9. This process is repeated until all z-image slices 20 have been processed. Once this is completed, the software is programmed to smooth the z-index buffer S10 using, for example, a Gaussian or Mean Filter to remove any incidental noise caused by the sharpness operator mentioned above. Using the smoothed z-index buffer, the software is configured to copy the sharpest pixels from each z-image slice S11 to build the in-focus composite EDF image S12.

Figure 2:
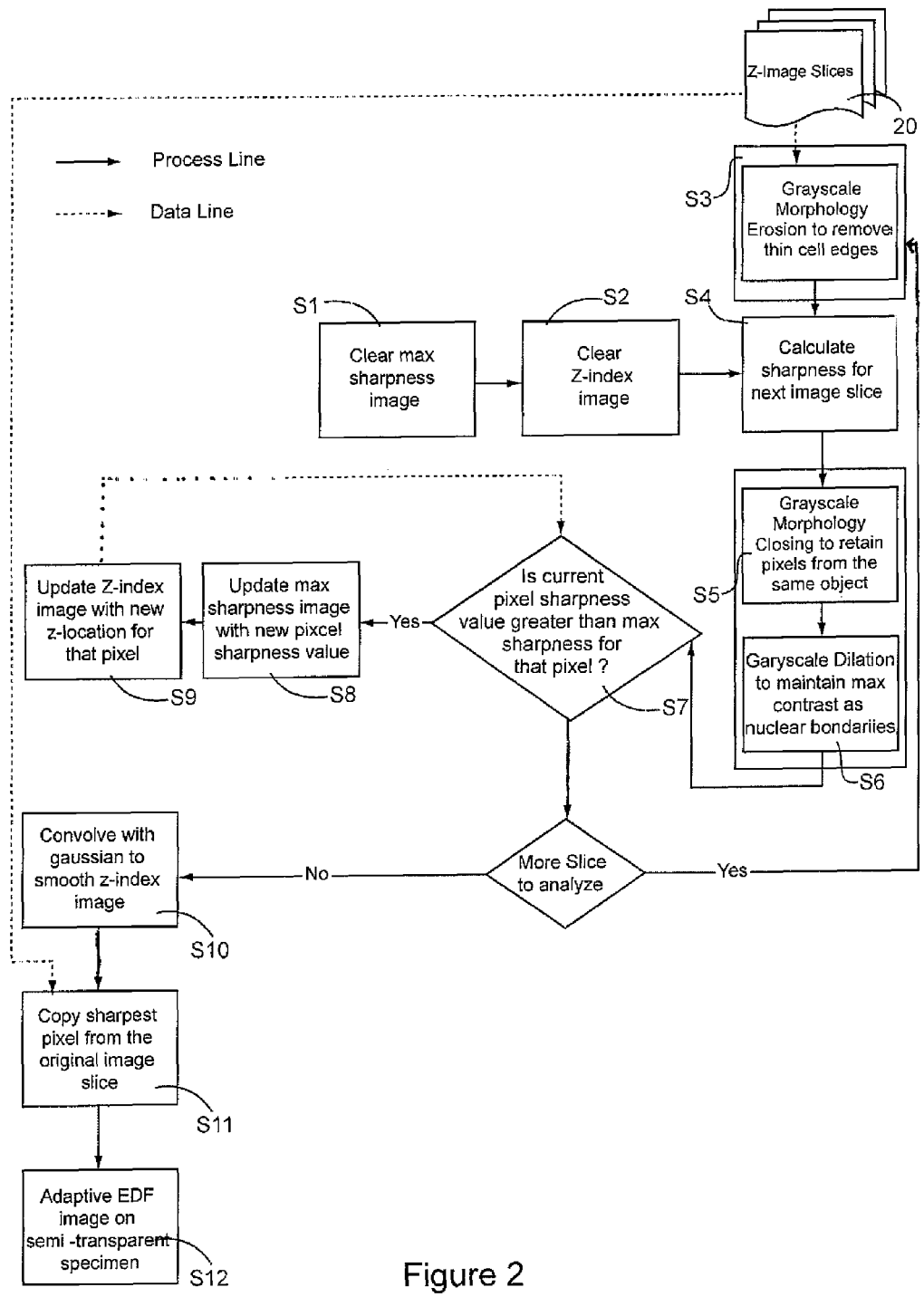
FIG. 2 is a block diagram showing the steps of an EDF algorithm according to an embodiment of the invention.

FIG. 2 shows various steps through which an embodiment of this invention may be implemented. Preferably, at least two separate modules are injected into the prior art EDF algorithm—the Pre and Post processing module Note that pre and post processing herein refers respectively to the step prior to and following the calculation of sharpness of each pixel in a slice. The purpose of these modules is to analyze the image and (a) to look for undesirable or non-diagnostic features and de-enhance those features, (b) look for preferable or diagnostic features and enhance those features, and (c) retain pixels from the same object to meet the PCO requirement.

In an embodiment of the invention, a stack of successive images is acquired using a microscope. In a preferred embodiment the focal distance between two slices is equal to half of the depth of field for the microscope objective used to meet the Nyquist criteria of optimum sampling. Persons skilled in the art of optics can calculate this depth of field based on the numerical aperture of the objective and wavelength of light used. However, one could increase the sampling distance provided one could afford the image quality degradation to gain additional processing speed.

The Pre-Processing module is to enhance and de-enhance features that otherwise cannot be done after calculating the sharpness of the z-image slice. In an embodiment of the invention, the Pre-Processing module comprises the step of performing an erosion S3, to remove thin edges of cell walls. This erosion will have no effect on cell nuclei and goblets cells due to its blob size. The ultimate effect of this erosion process is to retain the sharpness features for the cell nuclei and goblet cells and deemphasize the sharpness of cell walls that have no diagnostic value. The number of erosion iterations required is proportional to the pixel thickness of the cell boundary. Erosion algorithms, which are well known in the art, strip away a layer or layers of pixels from both the inside and the outside surfaces of an image This is achieved by extending a lighter background into a darker image that is being eroded. For example, an image that is shaped like a doughnut will lose pixels from the outside edge, and also from the inside surface of the doughnut hole. However, an image that resembles a solid ball will be eroded from the outside surface only. Cell walls, which have an outside surface and an inside surface, will be eroded from both the inside and outside. The cell's nucleus, on the other hand, will only be eroded from the outside surface. The images of cell walls, which are very thin, will typically not survive or will be significantly diminished as a result of being eroded from two sides. Whereas the images of cell nuclei, which are much larger and are only eroded from the outside surface, will be only minimally affected by the erosion process As a result, the diagnostically important information represented by the cell nucleus will be preserved, while the unimportant images of cell walls will be eliminated or diminished Subsequent to performing the erosion step S3 the software is programmed to calculate the sharpness value of each pixel in the z index slice S4.

It will be understood by those of ordinary skill in the art, that the sharpness of an image can be calculated in any of various ways or in any combination thereof. For example sharpness can be calculated (a) based on point process basis where sharpness is defined by comparing one pixel against z neighboring pixels only, (b) sharpness based on area process basis where sharpness is defined by comparing one pixels against it's x-y neighboring pixels (i.e. laplacian, sobel and mutual information), and (c) sharpness based on the frequency space of the transformed image (i.e. fourier and wavelet transforms).

Additionally, the image that is used for calculating sharpness can be RGB, grayscale, RGB converted to grayscale, or a weighted average of colors One could also find the sharpness in each color separately and then combine them After calculating the sharpness values, the software is configured to perform additional operations (the Post-Processing module) prior to advancing to the step of comparing pixel values (S7) In a preferred embodiment, as shown in FIG. 2, the Post-Processing module comprises the steps of performing two grayscale morphological operations. The first operation comprises a grayscale closing S5 on the sharpness values. This is needed to close any small holes within the cell nuclei and cell goblets, to assure all pixels of the object or cell are preserved to meet the PCO requirement. The closing size is proportional to the blob size of the nuclei and goblet cell. The second operation comprises a (grayscale) dilation S6 to expand the sharpness value by one or more pixels wide to maintain the max sharpness or contrast between the nuclei or goblet boundary and the background.

In further embodiments of the invention any of several methods are employed for enhancing and de-enhancing specific objects or features of interest These include, but are not limited to color, hue, object size and shape, aprori known x-y and z-location of objects to enhance/de-enhance objects.

Having executed the Post Processing steps, the software is configured to compare the sharpness value of each pixel in a slice with those from slices processed prior thereto. Note, that for the first slice in a stack of z index slices this step (S7) is omitted—as there are no acquired pixel values with which to compare. Instead the step (S7) of comparing pixels in each location with those corresponding to that location on previous slices is performed beginning with the second slice in a stack and on any slice obtained thereafter The remaining steps are executed as described above (with reference to FIG. 1), whereby the sharpest pixels from each of the slices are copied into one composite image S11—resulting in a unique z-index slice that is in focus everywhere and which displays diagnostically important information—substantially to the exclusion of non-important information. The z-index composite image is then stored on a data storage device, such as computer hardrive—for later access.

It should be noted that in other embodiments of the invention, the steps of performing an erosion (or several erosion) S3, a morphological closing S5 and a dilation S6 may be executed prior to the step of calculating the sharpness of the pixels within a given slice Moreover, in some embodiments, one or both of steps S5 and S6 may be omitted entirely.

The smoothing filter is used to suppress any noise outside the nuclei and goblets cells that might have caused by the sharpening filter. It will be understood by those of ordinary skill in the art, that many types of operators meet the smoothing filter, including but not limited to Mean Filters, Grayscale Morphology, and Recursive Gaussian Filters. The minimum size of the filter is proportional to the size of nuclei and goblet cells In one embodiment, it is not required to process the images at full resolution in which the image was captured. To gain speed in processing in this invention, the software could be configured to downscale the z-images slices first prior to EDF processing. Just before copying the sharpest pixels one would restore the smoothed z-index image to the original resolution. Additionally, or alternatively, in step S7, the system could be configured to compare only most, or some of the sharpest pixels with those of previous slices in the stack.

In one preferred embodiment, the software optimizes the number of z-slices processed, adapting the number of slices to the depth of the sample. During motion of the z-stage, the software detects when all pixels of the image are out-of-focus, or have past the slice of maximum sharpness. In this case it is not necessary to take any more z-slices, thereby speeding up the processing.

Once all the areas of interest on slide have been processed by the system and methods described herein above, the system is configured to stitch together the stored composite images in order to build a digital image of the entire specimen—or of areas of interest therefrom. Such stitching operations are well know in the art. After assembling the various composite slices—the resulting digital image of the specimen is in-focus substantially everywhere and comprises substantially only diagnostically important cellular features.

The inventive digital image may be displayed on a monitor for analysis by a pathologist, or may be analyzed by a trained computer. Preferably, however, the specimen is analyzed initially by a computer and subsequently by a pathologist or cytopathologist. Specifically, in one embodiment of the invention, computerized analysis is conducted on the inventive image using the computer system disclosed in U.S. Pat. Nos. 6,297,044 and 6,284,482. In connection with system of the aforementioned U.S. patents, a computer using an image recognition system as a primary classifier yields a subset of cells that may be abnormal A neural network system is employed as a secondary classifier to determine which of the subset of cells have the highest probability of being cancerous or pre-cancerous. A diagnosis is then made by a tertiary classifier—a trained pathologist—who examines the most abnormal appearing cells selected by the computer. Alternatively a computer system may comprise only a primary classifier that selects the most abnormal appearing cells in a specimen. Cells may be selected as abnormal based on morphology, abnormal keratinization or a combination of both—as compared to a stored cell library. In some embodiments, the computer works off of the assumption that there will be certain cells in a specimen that appear to be more abnormal than others. The computer will thus rank cells according to their abnormal appearance. It will be understood by those skilled in the art that any of various specialized computer analytical systems may be used to analyze the inventive image.

In other embodiments of the invention, the inventive image is sent via intranet or Internet to a remote user or to a remote computer for analysis by either a remote user and/or for remote computer analysis For the purpose of this document a "slice" (or "z index slice") refers to a digital image of an area of a slide taken from a particular focal distance. A "composite slice" refers to a digital image of an area of a specimen that was processed by the inventive system—for example, as set forth in FIG. 2. Images may be RGB, grey scale or acquired with a microscope filter wheel. It will be understood by those of ordinary skill in the art, that images may be acquired by any of various similar means The invention can be broadly defined as a method of constructing a digital image of at least a portion of a three-dimensional biological specimen, where the specimen presents cells having cell walls and cell nuclei, comprising the steps of:
  acquiring a plurality of image slices of at least a portion of the specimen from a plurality of focal distances;
  de-enhancing images cell walls;
  enhancing images of cell nuclei;
  selecting the sharpest pixels for each pixel location from among the plurality of slices; and
copying said sharpest pixels into a composite image.

In one embodiment of the invention, the processing steps that are the subject of the invention are implemented in an on-line mode. In this embodiment, instead of applying some are all of the processing steps disclosed herein on the whole stack of input images, the output is updated one image at a time without saving the original images. In another embodiment, the capturing of images and processing of images are done in two passes. In a first pass, images are first acquired and stored In a second pass, the stored images are processed by the processing steps of this invention.

Figure 3:
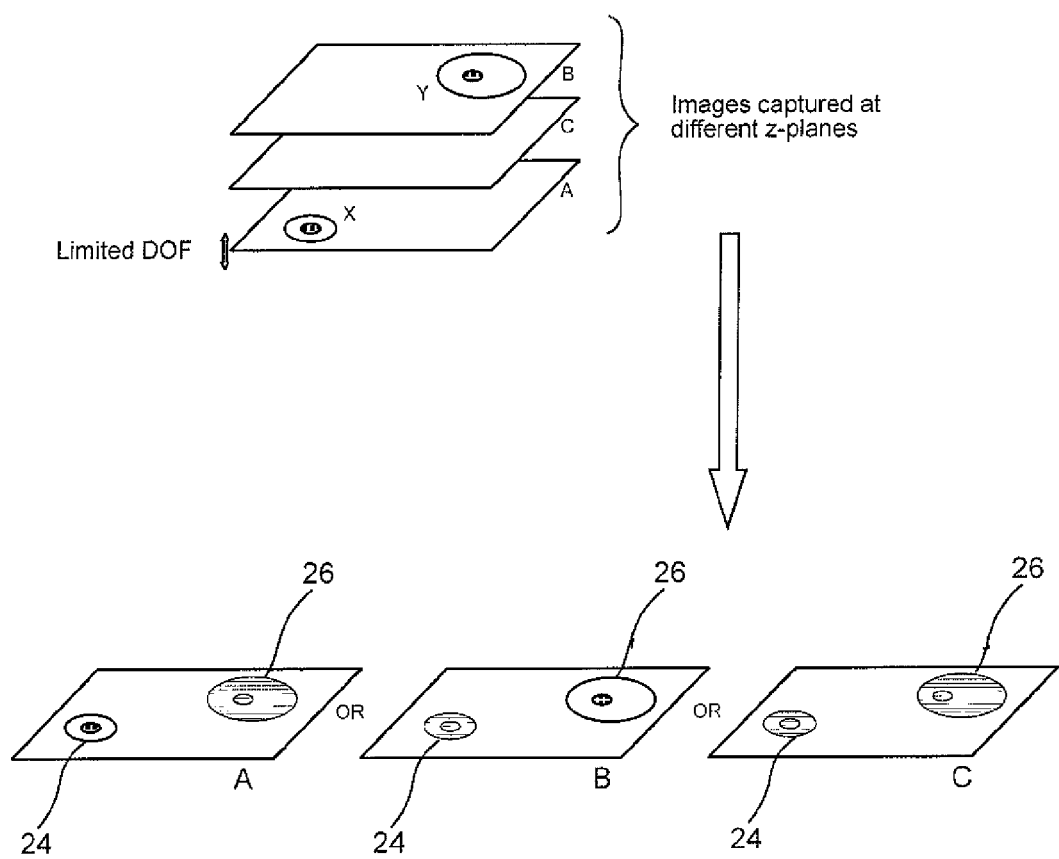
FIG. 3 shows two cells from three different z-distances
Figure 4:
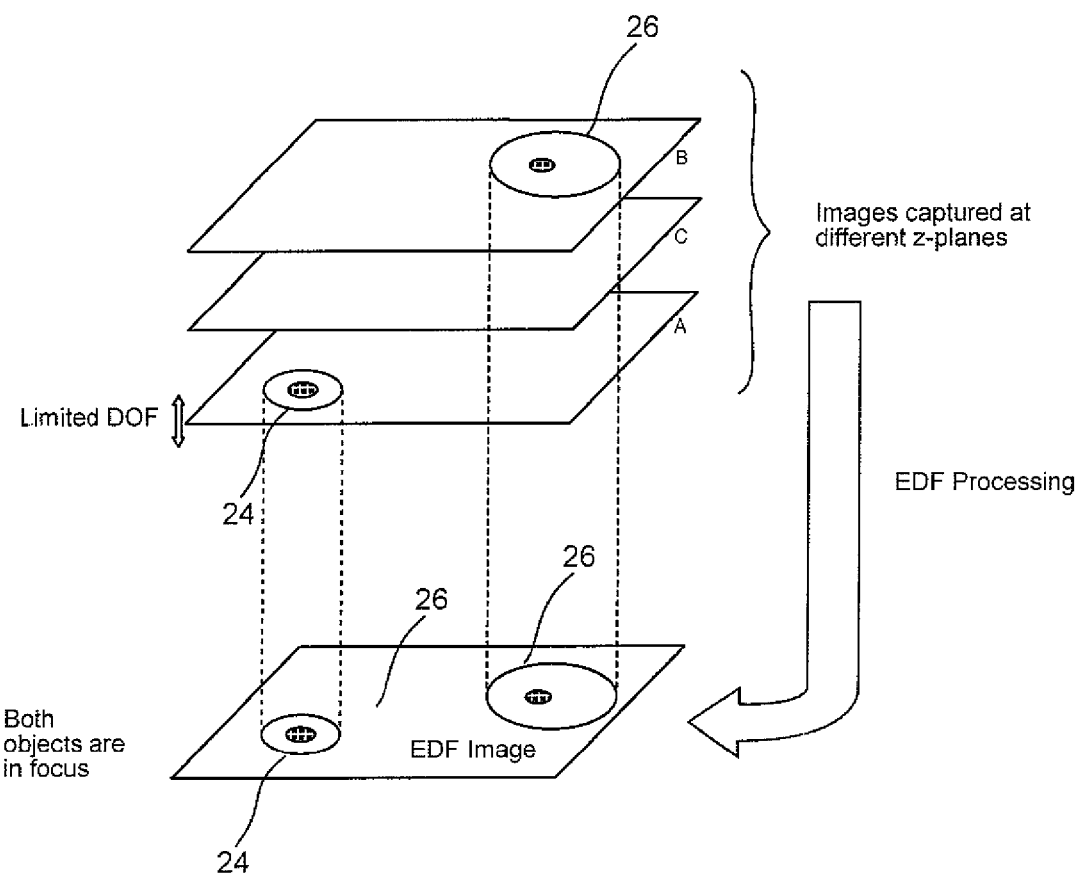
FIG. 4 shows a composite image of the two cells shown in FIG. 2 both of which are in focus.

Referring to FIG. 3 shows two representative cells 24, 26 on a slide from three different z distances As shown, using a conventional microscope at high resolution, when cell 24 appears in-focus, cell 26 may be out of focus—and vice versa (slices A, B). At another focal distance (slice C) both cells are out of focus. If cells 24 and 26 were on the same plane—one could easily scan the entire slide at high resolution. However, when analyzing a specimen of the current invention, the cells are located at different levels (not shown)—making conventional scanning less than optimal. Referring to FIG. 4, in the inventive EDF system, cells 24 and 26 will appear in focus.

Having described the invention with regard to specific embodiments, it is to be understood that the description is not meant as a limitation since further modifications and variations may be apparent or may suggest themselves to those skilled in the art. It is intended that the present application cover all such modifications and variations as fall within the scope of the appended claims.

What is claimed is:

1. A method for creating an image of at least a portion of a three-dimensional semi-transparent biological specimen, said method comprising the steps of:
    a) positioning a microscope slide under a microscope, said microscope slide comprising a three-dimensional biological specimen, said three-dimensional biological specimen comprising cells, said cells being located on different z-axis planes;
    b) obtaining a stack of images, said stack comprising a plurality of slices of said portion of said specimen, each of said plurality of slices comprising an image of said specimen obtained from a different focal distance, each of said slices comprising a plurality of pixels, said stack of images comprising images of at least two cells each of said at least two cells located on different z-axis planes;
    c) performing at least one of a closing and a dilation on said plurality of slices;
    d) calculating the sharpness values of said plurality of pixels in said plurality of slices in said stack and storing max-sharpness values for said plurality of pixels; and
    e) comparing the sharpness values for pixels in specific locations on a slice to stored max-sharpness values for pixels corresponding to said specific locations on previous slices in a stack.

2. The method of claim 1, wherein step (e) is performed on each pixel of a second slice in a stack of slices and slices obtained after said second slice.

3. The method of claim 1, further comprising the step of selecting the pixels having maximum sharpness as determined in step (e) and updating an index with said maximum sharpness values.

4. The method of claim 3, further comprising the step of copying the sharpest pixels from said index into a composite image.

5. The method of claim 1, wherein a morphological closing and a dilation is performed after step (d).

6. The method of claim 4, wherein a plurality of said composite images are stitched together to form a digital image of said specimen.

7. The method of claim 6, further comprising the step of displaying said digital image of said specimen on a monitor.

8. The method of claim 7, further comprising the step of analyzing said digital image with a specialized computer.

9. A system for creating a digital image of a semi-transparent three-dimensional biological specimen comprising:
    a semi-transparent cellular sample comprising disaggregated tissue, said cellular sample comprising cells overlying other cells;
    a computer apparatus;
    a microscope for obtaining a stack of image slices, each of said slices corresponding to different focal planes;
    a data storage device for storing said images;
    software configured to perform a plurality of erosions to de-enhance a cell boundary, a number of said plurality of erosions being proportional to a pixel thickness of a cell boundary, calculate maximum sharpness values for pixels of said slices, perform at least one of a closing and a dilation on said slices, and compare the maximum sharpness for pixels at various locations in a slice with that of pixels of corresponding locations from slices whose maximum sharpness have previously been calculated.

10. The system of claim 9, wherein said software is configured to select the pixels of maximum sharpness and build a composite image with said pixels of maximum sharpness.

11. The system of claim 10, wherein said software is configured to stitch together a plurality of said composite images to form a digital image of said three-dimensional biological specimen.

12. The system of claim 10, further comprising a computer analytical system for analyzing said digital image of said specimen.

13. A method of constructing a digital image of a three-dimensional biological specimen, said specimen comprising cells having cell walls and cell nuclei, said method comprising the steps of:
    obtaining a three-dimensional biological specimen, said specimen comprising cells, said cells being located on different z-axis planes;
    acquiring a plurality of image slices of said specimen from a plurality of focal distances;
    de-enhancing images cell boundaries;
    enhancing images of cell nuclei;
    selecting the sharpest pixels for each pixel location from among the plurality of slices; and
    copying said sharpest pixels into a composite image.

14. The method of claim 13, wherein said step of de-enhancing images of cell boundaries comprises the step of performing a morphological erosion.

15. The method of claim 13, wherein said enhancing step comprises the step of performing a dilation.

* * * * *